(12) United States Patent
Tan et al.

(10) Patent No.: US 9,994,790 B2
(45) Date of Patent: Jun. 12, 2018

(54) METHOD AND APPARATUS OF EXTRACTING LIPIDS AND PREPARING FATTY ACID ESTERS FROM MICROALGAE

(71) Applicant: NATIONAL TSING HUA UNIVERSITY, Hsinchu (TW)

(72) Inventors: Chung-Sung Tan, Hsinchu (TW); Hsin-Chih Wang, Changhua County (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 146 days.

(21) Appl. No.: 14/686,792

(22) Filed: Apr. 15, 2015

(65) Prior Publication Data
US 2015/0322373 A1   Nov. 12, 2015

(30) Foreign Application Priority Data

May 9, 2014   (TW) .............................. 103116563 A (51) Int. Cl.
| | |
|---|---|
| *C11B 1/04* | (2006.01) |
| *C11B 1/10* | (2006.01) |
| *C11B 1/02* | (2006.01) |
| *B01D 11/02* | (2006.01) |
| *B01J 19/24* | (2006.01) |
| *C11C 3/00* | (2006.01) |

(52) U.S. Cl.
CPC ............ *C11B 1/04* (2013.01); *B01D 11/0207* (2013.01); *B01D 11/0292* (2013.01); *B01J 19/24* (2013.01); *C11B 1/02* (2013.01); *C11B 1/10* (2013.01); *C11C 3/003* (2013.01); *B01J 2219/24* (2013.01)

(58) Field of Classification Search
None
See application file for complete search history.

(56) References Cited

FOREIGN PATENT DOCUMENTS

CN   102181320 A  *  9/2011

OTHER PUBLICATIONS

Golmakani et al. "Greener Solvents for Old Challenges". (2012). 5 pages.*

* cited by examiner

*Primary Examiner* — Amy L Clark
(74) *Attorney, Agent, or Firm* — CKC & Partners Co., Ltd.

(57) ABSTRACT

A method and an apparatus of extracting lipids from microalgae are provided. In the method, pressurized carbon dioxide ($CO_2$) is dissolved in a liquid alcohol to form a $CO_2$-expanded alcohol solution at a pressure of about 400-1500 psi and a temperature of about 30-65° C. Next, the $CO_2$-expanded alcohol solution contacts microalgae to extract the lipids from the microalgae. A method and an apparatus of preparing fatty acid esters from microalgae are disclosed as well.

6 Claims, 8 Drawing Sheets

Fig. 8

METHOD AND APPARATUS OF EXTRACTING LIPIDS AND PREPARING FATTY ACID ESTERS FROM MICROALGAE

CROSS-REFERENCE TO RELATED APPLICATION

This application claims the priority benefit of Taiwan application serial no. 103116563, filed May 9, 2014, the full disclosure of which is incorporated herein by reference.

BACKGROUND

Description of Related Art

Microalgae potentially offer great opportunities in many technical fields such as nutrients, chemicals and renewable energy. Microalgae species contain a variety of valuable nutrients such as docosahexaenolc acid (DHA), eicosapentaenoic acid (EPA), γ-linolenic acid (GLA) and arachidonic acid (AA). Further, a considerable amount of lipids is found in some microalgae species, and this provides applications in renewable energy. Microalgae are further employed to produce valuable substances that can be used in food, pharmaceuticals and cosmetics. However, those valuable components are enclosed by the tough cell walls of microalgae species, thus hindering the extraction of these components from microalgae. Therefore, there exists a need of a novel approach which would provide an effective extraction from microalgae.

SUMMARY

In one aspect, the present disclosure is directed to a method of extracting a desired component such as for example a nutrient and/or a lipid from microalgae. The method disclosed herein provides an increase in the extraction rate and a decrease in the extraction time period.

The method comprises the operations described below. First, pressurized $CO_2$ is dissolved in a liquid alcohol to form a single-phase $CO_2$-expanded alcohol solution at a pressure of about 400 psi to about 1500 psi and a temperature of about 30° C. to about 65° C. Next, a desired component such as for example a nutrient and/or a lipid is extracted from microalgae and dissolved into the $CO_2$-expanded alcohol solution by contacting the $CO_2$-expanded alcohol solution with the microalgae. There is no specific limitation on the operation of forming the $CO_2$-expanded alcohol solution. Particularly, continuous, batch, or semi-batch mode may be used to form the CO-expanded alcohol solution. Similarly, the contacting operation (namely, exaction operation) may be performed in continuous, batch, or semi-batch mode.

In another aspect, the present disclosure provides an apparatus of extracting a desired component such as for example a nutrient and/or a lipid from microalgae. The apparatus includes a $CO_2$ supply unit, an alcohol supply unit, a mixer, an extracting unit, and a pressure regulator. The $CO_2$ supply unit is used for supplying pressurized $CO_2$ gas. The alcohol supply unit is used for supplying a liquid alcohol. The mixer is connected to both the alcohol supply unit and the $CO_2$ supply unit, and is configured to mix the liquid alcohol and the pressurized $CO_2$ gas to form a $CO_2$-expanded alcohol solution. The mixer has a mixing outlet for exporting the $CO_2$-expanded alcohol solution. The extracting unit is used for holding microalgae and the $CO_2$-expanded alcohol solution inside to extract a desired component from the microalgae. The extracting unit has an extracting outlet and an extracting inlet connected to the mixing outlet. The pressure regulator is used for controlling a pressure inside the extracting unit, wherein the pressure regulator is connected to the extracting unit.

In yet another aspect, the present disclosure provides a method of producing fatty acid esters from microalgae. The method includes the operations described below. First, pressurized $CO_2$ is dissolved in a liquid alcohol to form a single-phase $CO_2$-expanded alcohol solution that is at a pressure of about 400 psi to about 1500 psi and a temperature of about 30° C. to about 65° C. Next, a fatty acid is extracted from microalgae and dissolved into the $CO_2$-expanded alcohol solution by contacting the $CO_2$-expanded alcohol solution with the microalgae. Then, transesterification reaction is performed to form a fatty acid ester from the $CO_2$-expanded alcohol solution containing the fatty acid. There is no specific limitation on the approaches of forming the $CO_2$-expanded alcohol solution, extracting the fatty acid and performing the transesterification reaction, all of which may be performed in continuous, batch, or semi-batch mode.

In yet another aspect, the present disclosure provides an apparatus of producing fatty acid esters from microalgae. The apparatus includes a $CO_2$ supply unit, an alcohol supply unit, a mixer, an extracting unit, a pressure regulator and a reactor. The $CO_2$ supply unit is used for supplying pressurized $CO_2$ gas. The alcohol supply unit is used for supplying a liquid alcohol. The mixer is connected to the alcohol supply unit and the $CO_2$ supply unit, and is configured to mix the liquid alcohol and the pressurized $CO_2$ gas to form a $CO_2$-expanded alcohol solution. The mixer has a mixing outlet for exporting the $CO_2$-expanded alcohol solution. The extracting unit is used for holding microalgae and the $CO_2$-expanded alcohol solution inside to extract a fatty acid from the microalgae. The extracting unit has an extracting outlet and an extracting inlet connected to the mixing outlet. The pressure regulator is used for controlling a pressure inside the extracting unit, wherein the pressure regulator is connected to the extracting unit. The reactor is connected to the extracting outlet and configured to perform a transesterification reaction of the $CO_2$-expanded alcohol solution containing the extracted lipid.

The foregoing presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later. Many of the attendant features will be more readily appreciated as the same becomes better understood by reference to the following detailed description considered in connection with the accompanying drawings.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. As used herein, "around". "about" or "approximately" shall generally mean within 20 percent, preferably within 10 percent, and more preferably within 5 percent of a given value or range. Numerical quantities given herein are approximate; meaning that the term "around", "about" or "approximately" can be inferred if not expressly stated. It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

According to various embodiments of the present disclosure, a method of extracting a desired component such as for example a nutrient and/or a lipid from microalgae is provided. According to some embodiments, unsaturated and/or saturated fatty acids are extracted from microalgae to produce valuable nutrients or substance used in food and/or pharmaceuticals. According to yet some embodiments, the extracted lipids may be used to produce fatty acid esters, which are major components of biodiesel.

Advantages of the usage of microalgae as a feedstock to produce nutrients, lipids or other components include: (1) high efficiency of lipids production on per unit area; (2) higher $CO_2$ consumption for growing unit microalgae, as compared to other biomass energy crops; (3) suitable for large-scale planting; and (4) fast grow rate. Microalgae contains more than 50 wt % of carbon, which mostly comes from the absorbed $CO_2$ by photosynthesis. Therefore, microalgae cultivation can fix $CO_2$ in the atmosphere to mitigate global warming.

Although the usage of microalgae offers several advantages described above, the desired component in the microalgae are difficult to be extracted as the microalgae possess tough cell walls which are difficult to be penetrated. In some aspects, there further faces certain technical problems in the transesterification of the extracted lipids to produce fatty acid esters. For example, when a base is used as the catalyst in the transesterification reaction, trace amount of water and/or free fatty acids may cause saponification reaction, and leading to a decrease in the conversion rate of the transesterification. In contrast, when an acid is used as the catalyst, the reaction rate of the transesterification is relatively slow, as compared with base catalyst.

According to the present disclosure, various embodiments are provided to resolve the technical issues mentioned above. Therefore, an aspect of the present disclosure is to provide a method and an apparatus of extracting a desired component such as for example a nutrient and/or a lipid from microalgae. Another aspect of the present disclosure is to provide a method and an apparatus of producing fatty acid esters from microalgae.

Method of Extracting Lipids from Microalgae

Figure 1:
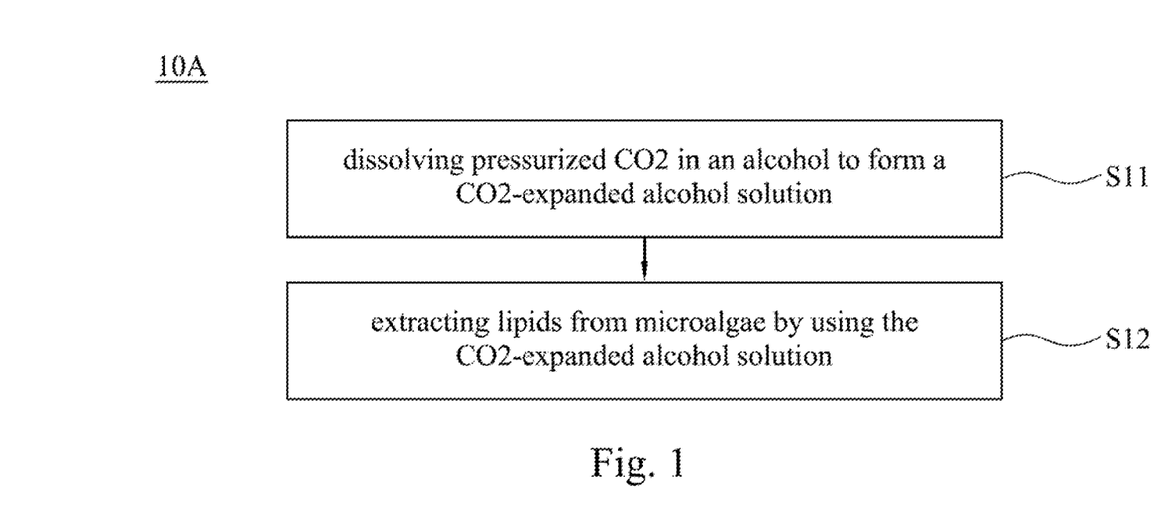
FIG. 1 is a flowchart of a method for extracting lipids from microalgae according to some embodiments of the present disclosure.

FIG. 1 is a flowchart illustrating a method 10A for extracting a desired component such as for example a nutrient and/or a lipid from microalgae according to some embodiments of the present disclosure. In FIG. 1, the method 10A includes an operation S11 of dissolving pressurized $CO_2$ in a liquid alcohol to form a "$CO_2$-expanded alcohol solution," and an operation S12 of extracting the desired nutrient and/or lipid from microalgae by using the $CO_2$-expanded alcohol solution. The details of the operations S11 and S12 are described hereinafter.

In operation S11, pressurized $CO_2$ is mixed with liquid alcohol to form a single-phase $CO_2$-expanded solution. When pressurized $CO_2$ is dissolved in a liquid alcohol, the volume of the liquid alcohol is increased so as to form a $CO_2$-expanded solution (also referred to as "$CO_2$-expanded alcohol solution"). The volumetric expansion of the $CO_2$-expanded alcohol solution is related to the pressure and the temperature thereof. According to some embodiments of the present disclosure, the $CO_2$-expanded alcohol solution is at a pressure of about 400 psi to about 1500 psi and a temperature of about 30° C. to about 65° C.

The extraction yield in the later operation S12 is significantly increased by using the $CO_2$-expanded alcohol solution as an extractant. According to some embodiments of the present disclosure, a higher lipid extraction rate is obtained by using the $CO_2$-expanded alcohol solution as the extractant, compared to a pure liquid alcohol as the extractant at the same extraction temperature and pressure. Moreover, the $CO_2$-expanded alcohol solution may extract a large amount of lipids in a short time period. In examples, the lipid extraction rate of the CO-expanded alcohol solution is 5 folds of that of the pure liquid alcohol at the extraction time period of 10 minutes.

The pressure of the $CO_2$-expanded alcohol solution is ranged from about 400 psi to about 1500 psi according to some embodiments of the present disclosure. When the pressure is less than about 400 psi or greater than about 1500 psi, the lipid extraction rate from the microalgae decreases. Without being bounded to any theory, it is believed that when the pressure is increased, the volumetric expansion of the $CO_2$-expanded alcohol solution increases (Chang, C. J.; Chiu, K. L.; Day, C. Y., *J. Supercrit. Fluids*. 1998, 12, 223-237), and this leads to an increase in the diffusion coefficient and a decrease in the surface tension of the $CO_2$-expanded alcohol solution, and therefore these effects facilitates the lipids extraction from microalgae. Nevertheless, certain negative effects are accompanied by the volumetric expansion of the $CO_2$-expanded alcohol solution. In specifics, the alcohol amount per unit volume of the extractant is undesirably decreased, and further the retention time of the extractant in the extracting tank is decreased, thus hindering the lipids extraction from microalgae. Therefore, there appears a desirable pressure range for lipids extraction, i.e. approximately 400-1500 psi, according to some embodiments of the present disclosure.

The temperature of $CO_2$-expanded alcohol solution is ranged from about 30° C. to about 65° C. according to some embodiments of the present disclosure. When the temperature of the $CO_2$-expanded alcohol solution is lower than about 30° C. or higher than about 65° C., the lipids extraction rate is relatively low. Not limited on any theory, it is believed that raising temperature may increase the solubility of lipids in the $CO_2$-expanded alcohol solution, and this facilitates the lipids extraction from microalgae. On the other hand, raising temperature unfavorably reduces the volumetric expansion of the $CO_2$-expanded alcohol solution, and therefore impedes the lipids extraction from microalgae. Accordingly, the temperature of the $CO_2$-expanded alcohol solution is desirable in the range of approximately 30-65° C.

In some embodiments, the volumetric expansion rate of the $CO_2$-expanded alcohol solution is about 50% to about 350%. The term "volumetric expansion rate" herein is calculated by the following formula (1):

$$\beta = (V_{EL} - V_A)/V_A \times 100\% \quad (1);$$

in which $\beta$ is the volumetric expansion rate, $V_{EL}$ is the volume of the $CO_2$-expanded alcohol solution, and $V_A$ is the volume of the liquid alcohol at the same temperature and pressure as the $CO_2$-expanded alcohol solution.

The pressure and temperature of the $CO_2$-expanded alcohol solution as well as the molar ratio of the $CO_2$ to the liquid alcohol have to be controlled in a range to form a single-phase solution. In other words, the $CO_2$ and the liquid alcohol form a single-phase extractant; rather than a substantially two-phase extractant. More specifically, since the amount of $CO_2$ that can be dissolved in a certain amount of the liquid alcohol is limited by the saturation solubility at the temperature and the pressure, the mixing ratio (i.e. molar ratio or weight ratio) of the $CO_2$ to the liquid alcohol have to be controlled to be less than the saturation solubility of $CO_2$ in the liquid alcohol. In some embodiments, the single-phase extractant composed of the pressurized $CO_2$ and the liquid alcohol provides an important effect on the lipids extraction. According to some embodiments, the single-phase extractant shows an extraction rate greater than that of the two-phase extractant in the later operation S12.

According to some embodiments of the present disclosure, the liquid alcohol is ethanol. In yet some embodiments, the liquid alcohol may be methanol, propanol or the like.

In some embodiments, the liquid alcohol is ethanol, and the $CO_2$-expanded alcohol solution is at a pressure of about 800 psi to about 1200 psi and a temperature of about 35° C. to about 45° C. for obtaining a better lipids extraction rate. However, the present disclosure is not limited to the specific ranges of temperature and pressure mentioned above because some embodiments of the present disclosure may be implemented at other temperatures and pressures.

According to some embodiments, the molar fraction of the $CO_2$ in the $CO_2$-expanded alcohol solution is about 0.2 to about 0.8, depending on various operation temperatures and pressures. In some examples, the liquid alcohol is ethanol, and the molar fraction of the $CO_2$ in the $CO_2$-expanded alcohol solution is ranged from about 0.4 to about 0.63 in terms of lipids extraction rate.

The approach of forming the $CO_2$-expanded alcohol solution has no special limitation. In some embodiments, the liquid alcohol and the pressurized $CO_2$ may be continuously transported into a mixer, and the obtained $CO_2$-expanded alcohol solution continuously flows out of the mixer. In yet some embodiments, batch or semi-batch approaches may be employed to form the $CO_2$-expanded alcohol solution.

In operation S12, the $CO_2$-expanded alcohol solution is allowed to be in contact with microalgae, which contains lipids, so as to dissolve the lipids into the $CO_2$-expanded alcohol solution. The term "lipids" used in the present disclosure includes, but not limited to, fatty acids, glycerolipids, glycerophospholipids, sphingolipids, saccharolipids, polyketides, sterol lipids, and prenol lipids.

In some embodiments of the present disclosure, the extracted lipids in operation S12 at least include fatty acids such as for example C14-C22 saturated and/or unsaturated fatty acids. Specifically, the fatty acids may be tetradecanoic acid, pentadecanoic acid, hexadecanoic acid, heptadecanoic acid, octadecanoic acid, and/or docosahexaenoic acid (DHA).

The is no specific limitation on the approach or the apparatus of contacting the $CO_2$-expanded alcohol solution with the microalgae. In some embodiments, the microalgae are filled in a fixed bed, and the $CO_2$-expanded alcohol solution continuously flows through the fixed bed to extract the lipids from the microalgae. In yet some embodiments, the lipids are exacted by the $CO_2$-expanded alcohol solution in a batch or semi-batch extractor.

In some embodiments, the microalgae include *Chlorella* genus. *Chlorella* contain rich lipids, about 18-57 wt %, and are easily cultivated. In some embodiments, *Schizochytrium* species or other microalgae similar to the *Schizochytrium* species may be used in terms of the growth time and lipid content of microalgae. The term "microalgae similar to the *Schizochytrium* species" herein refers to microalgae belonging to the *Chlorella* genus that have a cultivation time period of less than 14 days and contain a lipid content of more than 35 wt %. In yet some embodiments, the microalgae may be *Crypthecodinium, Schizochytrium, Nannochloropsis, Phaeodactyium, Nitzschia, Pavlova, Spirulina*, or *Porphyridium*. The microalgae feedstock is not specifically limited on certain forms, and both treated and untreated microalgae may be used. In some embodiments, raw microalgae, which are not dehydrated and dried, are used as feedstock. However, in yet some embodiments, the microalgae are dehydrated and dried to form particles or powder. The method of dehydration may be lyophilization, for example.

Microalgae contain many valuable compounds such as for example unsaturated fatty acids. Table 1 lists several unsaturated fatty acids contained in microalgae and applications of those unsaturated fatty acids. According to some embodiments of the present disclosure, the $CO_2$-expanded alcohol solution shows excellent extraction to both unsaturated and saturated fatty acids. Therefore, the extraction method disclosed herein may be employed to extract unsaturated fatty acids and/or other valuable components in microalgae. The method disclosed herein is not limited to the manufacture of biodiesel or precursors thereof.

TABLE 1

Unsaturated fatty acids contained in microalgae and applications thereof

| Polyunsaturated fatty acids (PUFA) | Applications | Microalgae |
|---|---|---|
| Docosahexaenoic acid (DHA) | infant formula nutritional supplements, aquaculture fertilizer | *Crypthecodinium* *Schizochytrium* |
| Eicosapentaenoic acid (EPA) | nutritional supplements aquaculture fertilizer | *Nannochloropsis* *Phaeodactylum* *Nitzschia* *Pavlova* |
| γ-Linolenic acid (GLA) | infant formula nutritional supplements | *Spirulina* |
| Arachidonic acid | infant formula nutritional supplements | *Porphyridium* |

In some embodiments, prior to performing operation S12, the method 10A further includes an operation of immersing the microalgae in a pressurized liquid alcohol for a time period. The pressure of the pressurized liquid alcohol is about 400 psi to about 1500 psi. The operation S12 is performed after the immersing operation mentioned above.

In yet some embodiments, the method 10A may further comprise other operations. In examples, after performing the operation S12, the pressure of the $CO_2$-expanded alcohol solution, which contains the exacted lipids, is reduced to a relatively low pressure, for example about 1 atm to about 10 atm, such that the $CO_2$-expanded alcohol solution is transformed into gaseous $CO_2$ and liquid alcohol solution containing the extracted lipids. Next, the lipids are separated from the liquid alcohol so that the extracted lipids are obtained. For example, vacuum drying or heating processes may be applied to vaporize the alcohol, thus obtaining the lipids.

Apparatus of Extracting Lipids from Microalgae

Figure 2:
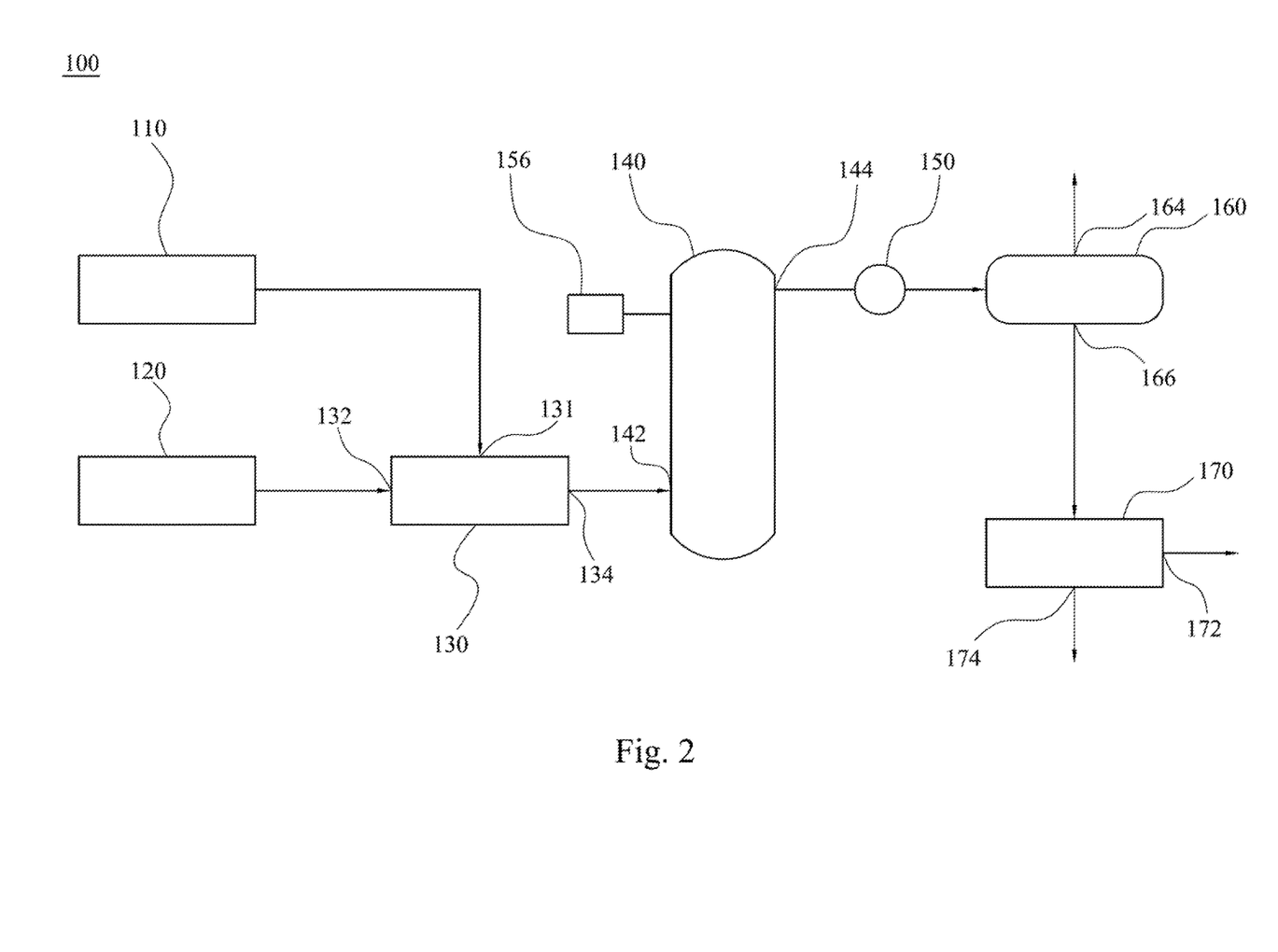
FIG. 2 is a diagram of an apparatus for extracting lipids from microalgae according to some embodiments of the present disclosure.

According to another aspect of the present disclosure, an apparatus of extracting a desired component such as for example a nutrient and/or a lipid from microalgae is provided. FIG. 2 is a diagram illustrating an apparatus 100 for extracting a nutrient and/or a lipid from microalgae according to some embodiments of the present disclosure. In FIG. 2, the apparatus 100 includes a $CO_2$ supply unit 110, an alcohol supply unit 120, a mixer 130, an extracting unit 140 and a pressure regulator 150.

The $CO_2$ supply unit 110 is configured to supply pressurized $CO_2$ gas, and the alcohol supply unit 120 is configured to supply a liquid alcohol. The $CO_2$ supply unit 110 and the alcohol supply unit 120 are connected to the mixer 130. The liquid alcohol and the pressurized $CO_2$ gas are mixed in the mixer 130 to form the $CO_2$-expanded alcohol solution. In some embodiments, the mixer 130 has a first inlet 131 and a second inlet 132 respectively connected to the $CO_2$ supply unit 110 and the alcohol supply unit 120. The mixer 130 further has a mixing outlet 134 for exporting the $CO_2$-expanded alcohol solution, as illustrated in FIG. 2.

The extracting unit 140 is configured to be filled with microalgae, and allows the $CO_2$-expanded alcohol solution to extract the lipids from the microalgae. The extracting unit 140 has an extracting inlet 142 and an extracting outlet 144, in which the extracting inlet 142 is connected to the mixing outlet 134 of the mixer 130. The $CO_2$-expanded alcohol solution is transported into the extracting unit 140 through the extracting inlet 142 to perform extraction, and then leaves the extracting unit 140 from the extracting outlet 144.

The pressure regulator 150 is connected to the extracting unit 140 for controlling the pressure inside the extracting unit 140. Although FIG. 2 depicts that the pressure regulator 150 is disposed at a position after the extracting unit 140, the pressure regulator 150, however, is not limited to the configuration shown in FIG. 2. In some embodiments, the pressure regulator 150 may be disposed at a position prior to the extracting unit 140.

In some embodiments, the apparatus 100 may further includes a temperature controller 156 to control the temperature of the extracting unit 140 and/or the mixer 130.

In yet some embodiments, the apparatus 100 further includes a pressure reducing unit 160 connected to the extracting outlet 144. The pressure reducing unit 160 is configured to receive the $CO_2$-expanded alcohol solution transported from the extracting unit 140, and to reduce the pressure of the $CO_2$-expanded alcohol solution such that the $CO_2$-expanded alcohol solution is transformed into gaseous $CO_2$ and an liquid alcohol solution containing the lipids. The gaseous $CO_2$ is transported to a piping system from a gas outlet 164 of the pressure reducing unit 160, whereas the liquid alcohol solution containing the lipids leaves the pressure reducing unit 160 from a liquid outlet 166 thereof.

In yet some embodiments, the apparatus 100 further includes a separating unit 170 connected to the liquid outlet 166 of the pressure reducing unit 160. The separating unit 170 is configured to separate the extracted lipids from the liquid alcohol. The separated liquid alcohol is transported to a piping system from an alcohol outlet 172 of the separating unit 170, and the separated lipids is transported to another pipe system from a lipid outlet 174 of the separating unit 170.

The $CO_2$-expanded alcohol solution provides many prominent advantages in the lipids extraction from microalgae. Specifically, although the microalgae contain rich lipids, these lipids, however, are difficult to be rapidly and completely extracted because the cell walls of the microalgae are too tough to be penetrated. Therefore, according to various embodiments of the present disclosure, the $CO_2$-expanded alcohol solution is used to extract the lipids from microalgae. The diffusion coefficient of the $CO_2$-expanded alcohol solution is approximately 10 to 100 folds of that of a common liquid. That is, the mass transfer resistance of the $CO_2$-expanded alcohol solution is far less than that of common liquids, and the mass transfer in the $CO_2$-expanded alcohol solution is faster as compared to common liquids. In addition, the surface tension of the $CO_2$-expanded alcohol solution is very small, so that the $CO_2$-expanded alcohol solution efficiently penetrates through the cell walls of the microalgae to extract the lipids in the microalgae. Therefore, the $CO_2$-expanded alcohol solution is a more efficient extractant than common extracting solvents. Furthermore, $CO_2$ is gas at a normal temperature and pressure so that $CO_2$ may be easily separated from other substances without any residue by simply reducing pressure, and the extracted components are not unfavorably affected by $CO_2$.

Method of Preparing Fatty Acid Esters from Microalgae

According to some embodiments of the present disclosure, the $CO_2$-expanded alcohol solution that contains extracted lipids may be a precursor of biodiesel. In some examples, the mixture of $CO_2$-expanded alcohol solution and the extracted fatty acids may be heated to produce fatty acid esters by a transesterification reaction. Therefore, according to another aspect of the present disclosure, a method of producing fatty acid esters from microalgaes is provided.

Figure 3:
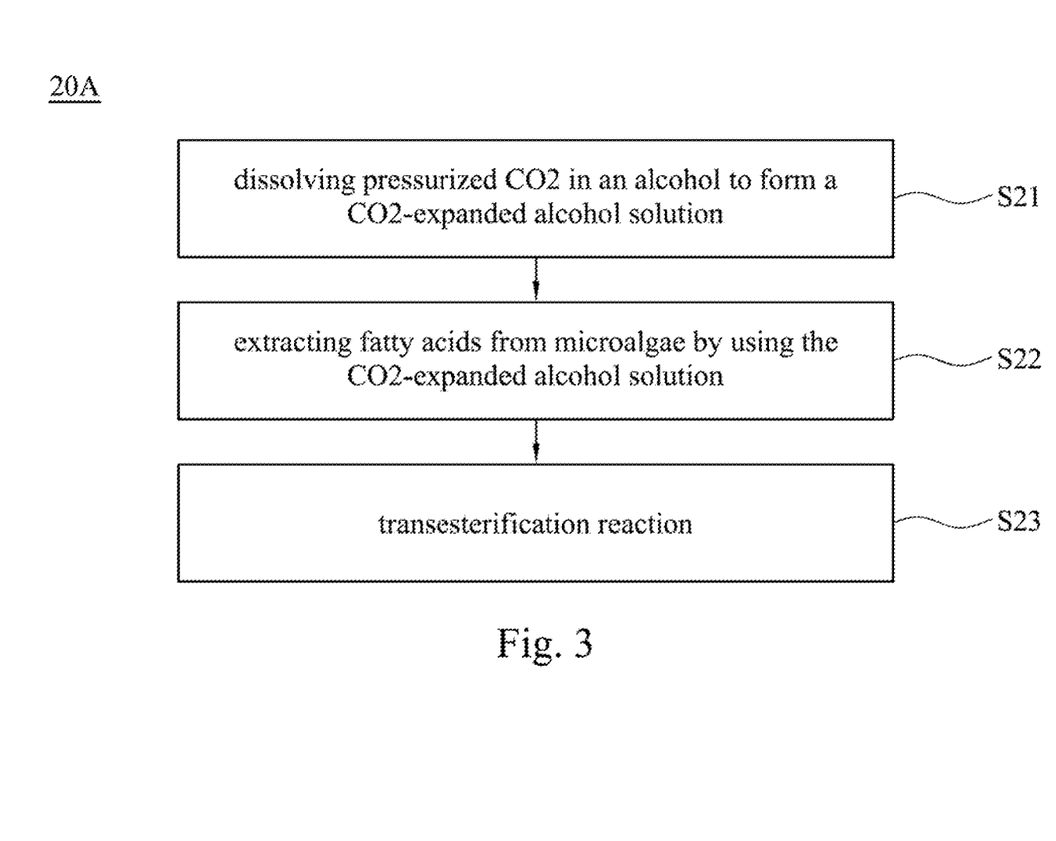
FIG. 3 is a flowchart of a method for preparing fatty acid esters from microalgae according to some embodiments of the present disclosure.

FIG. 3 is a flowchart illustrating a method 20A for preparing fatty acid esters from microalgae according to some embodiments of the present disclosure. The method 20A includes operations S21, S22, and S23.

In operation S21, pressurized $CO_2$ is dissolved in a liquid alcohol to form a $CO_2$-expanded alcohol solution. The operation S21 may be performed and implemented in the same manner as that described hereinbefore in connection with the operation S11, and therefore the detailed description will be omitted to avoid repetition.

In operation S22, microalgae containing fatty acids are allowed to be in contact with the $CO_2$-expanded alcohol solution such that the fatty acids are dissolved in the $CO_2$-expanded alcohol solution. The operation S22 may be performed and implemented in the same manner as that described hereinbefore in connection with the operation S12, and therefore the detailed description will be omitted to avoid repetition.

In operation S23, the $CO_2$-expanded alcohol solution containing the extracted fatty acids undergoes a transesterification reaction to form fatty acid esters. The transesterification reaction produces fatty acid ester and glycerol from the fatty acids and alcohol in the presence of catalyst. The reaction formula is shown in the following formula (2):

-continued

In some embodiments, the $CO_2$-expanded alcohol solution containing the extracted fatty acids is heated to perform the transesterification reaction. In some examples, the used catalyst is acid, and the transesterification is performed at a temperature of about 70° C. to about 200°C. and a pressure of about 1000 psi to about 2000 psi. The transesterification reaction may be performed in a continuous reactor, batch reactor or semi-batch reactor.

Apparatus of Preparing Fatty Acid Ester from Microalgae

Figure 4:
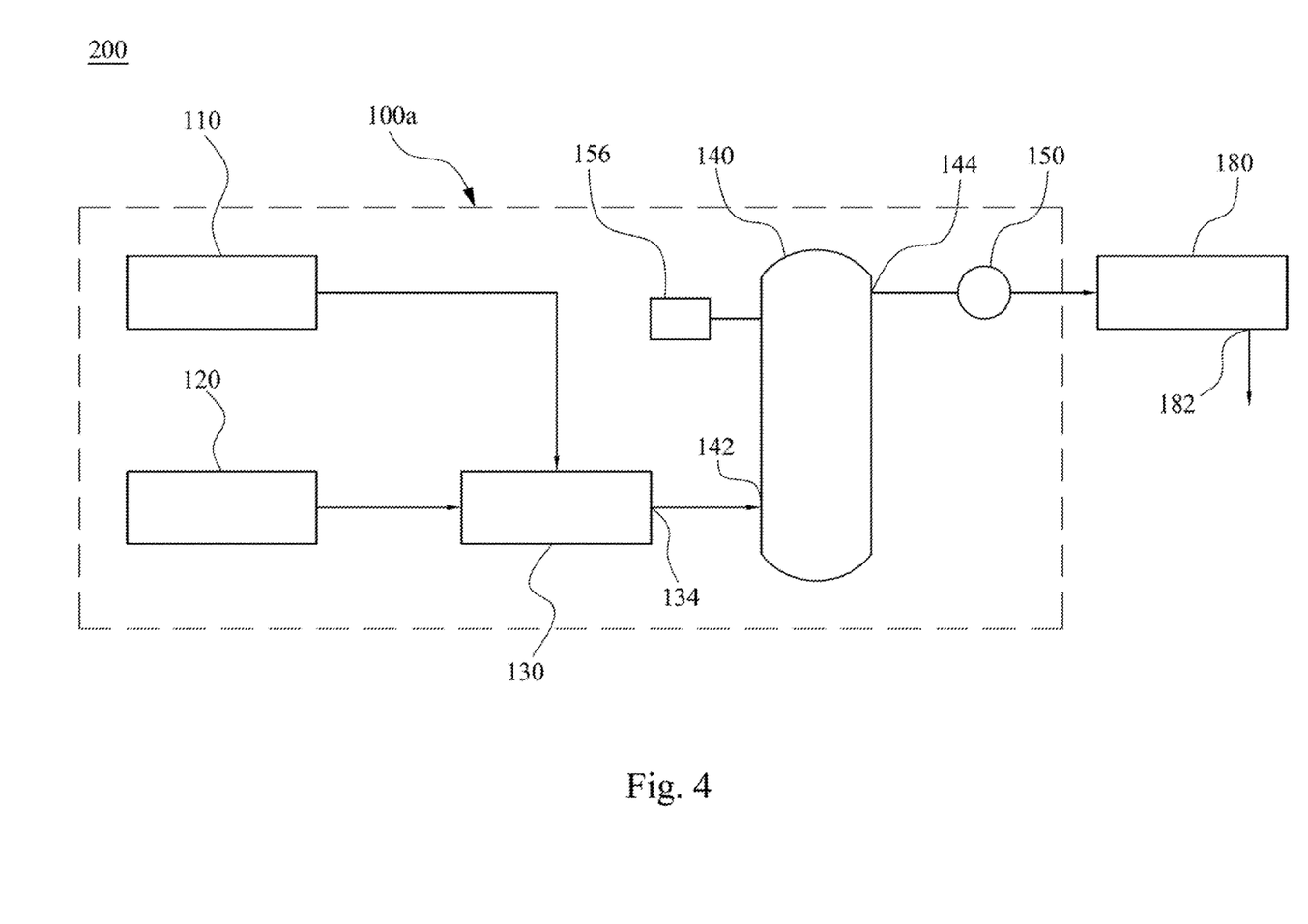
FIG. 4 is a diagram of an apparatus for preparing fatty acid esters from microalgae according to some embodiments of the present disclosure.

Another aspect of the present disclosure is to provide an apparatus of producing fatty acid esters from microalgae. FIG. 4 is a diagram illustrating an apparatus 200 for producing fatty acid esters from microalgae according to some embodiments of the present disclosure. In FIG. 4, the apparatus 200 includes an extracting apparatus 100a and a transesterification reactor 180.

The extracting apparatus 100a includes a $CO_2$ supply unit 110, an alcohol supply unit 120, a mixer 130, an extracting unit 140 and a pressure regulator 150. In FIG. 4 and FIG. 2, the same or similar features are identified by the same reference numerals. These features are the same as or similar to like-numbered features described with respect to apparatus 100 shown in FIG. 2. Therefore, the description will be omitted to avoid repetition.

The transesterification reactor 180 is connected to the extracting outlet 144 of the extracting unit 140, and is configured to carry out a transesterification reaction of the $CO_2$-expanded alcohol solution with the extracted fatty acids so as to produce fatty acid esters. The products of the transesterification reaction are transported to a piping system through an outlet 182 of the transesterification reactor 180.

EXAMPLES AND COMPARED EXAMPLES

The examples below are used to illustrate some aspects of the present disclosure in details to enable a person skilled in the art to implement the present disclosure. The compared examples below are described to enable a person skilled in the art to more appreciate the present disclosure and the technical effect thereof. The examples and the compared examples herein are not intended to limit the present disclosure.

Example 1.1

Soxhlet Extraction

A commercial apparatus of Soxhlet extraction was used to extract lipids from 10.027 g of lyophilized powder of *Schizochytrium* by using 200 mL of ethanol for extracting 48 hours. After the extraction, the ethanol containing the extracted lipids was transferred into a rotary evaporator to remove ethanol at 80° C. to obtain dried extracts, and the extracts were then weighted. The Soxhlet extraction result was used as a comparing basis. The detailed extracting conditions and results are summarized in Table 2 below. The results show that there are 40.1 wt % of substances in microalgae can be extracted.

TABLE 2

| Soxhelt extracting conditions and results | |
|---|---|
| microalgae | 10.027 g *Schizochytrium* |
| Extracting conditions | 200 mL ethanol (99.7%) |
| | Reflux at 100° C. for 48 hours |
| Extracts | 4.018 g |
| | 40.1 wt % |
| Effective lipid extraction rate | 35.7% |

Example 1.2

Extracts Analysis

The obtained extracts above were analyzed by gas chromatography mass spectrometer (GC-MS). It was found that many impurities affect the analysis result. Moreover, the boiling point of triacylglycerols containing fatty acids is too high to be analyzed by GC-MS. Therefore, the extracted lipids were methylated to transform the fatty acid to methyl fatty acid, and then be analyzed by GC-MS. The GC-MS used a capillary column (DB-5MS, 30 m×250 mm×0.25 mm noimal) as the analysis column, and 1 mL/min He as the carrier gas. During the analysis by GS-MS, the temperature was increased from 50° C. to 300° C. by a gradient of 10° C./min and maintained at 300° C. for 30 minutes. The result is shown in FIG. 5.

Figure 5:
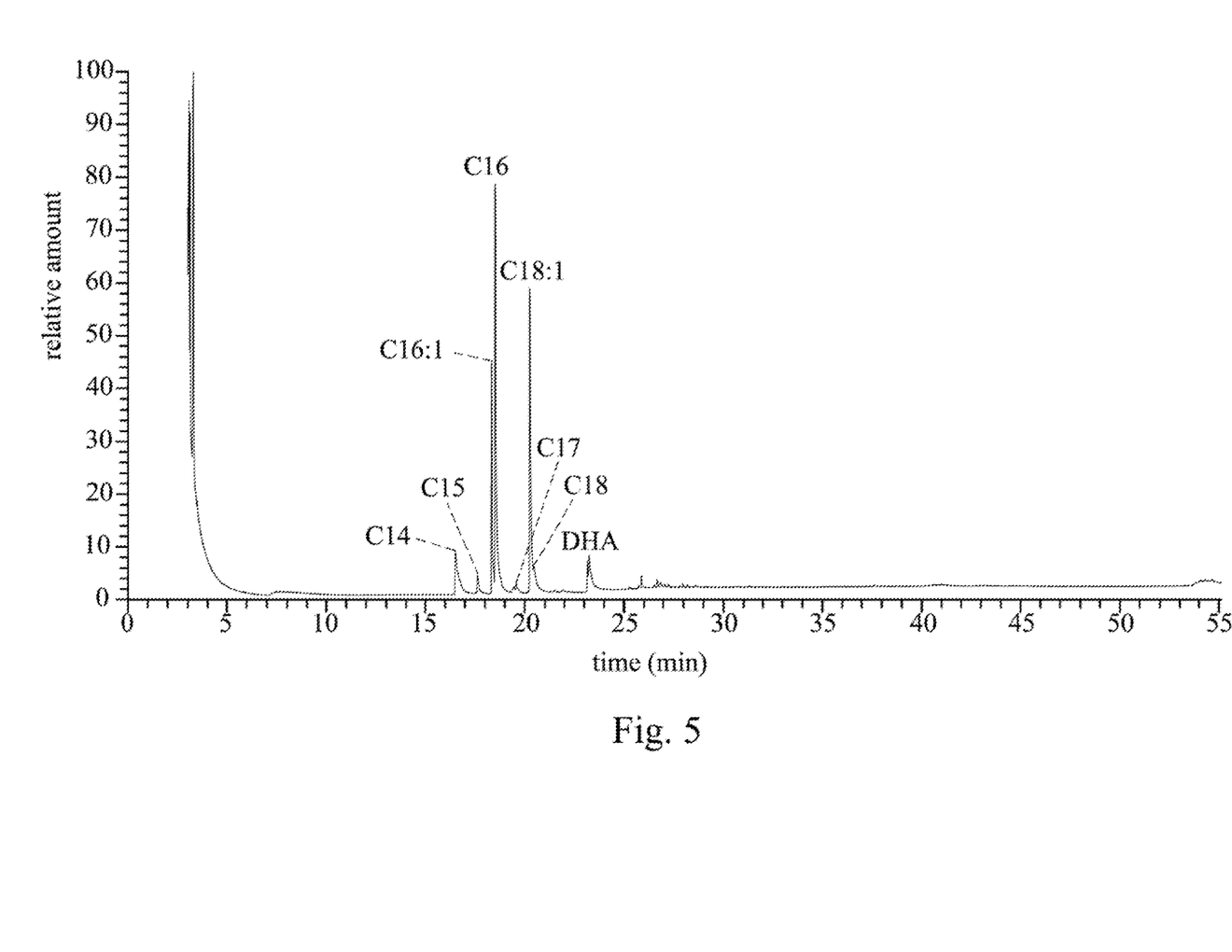
FIG. 5 shows the analysis result of gas chromatography mass spectrometry.
Figure 6:
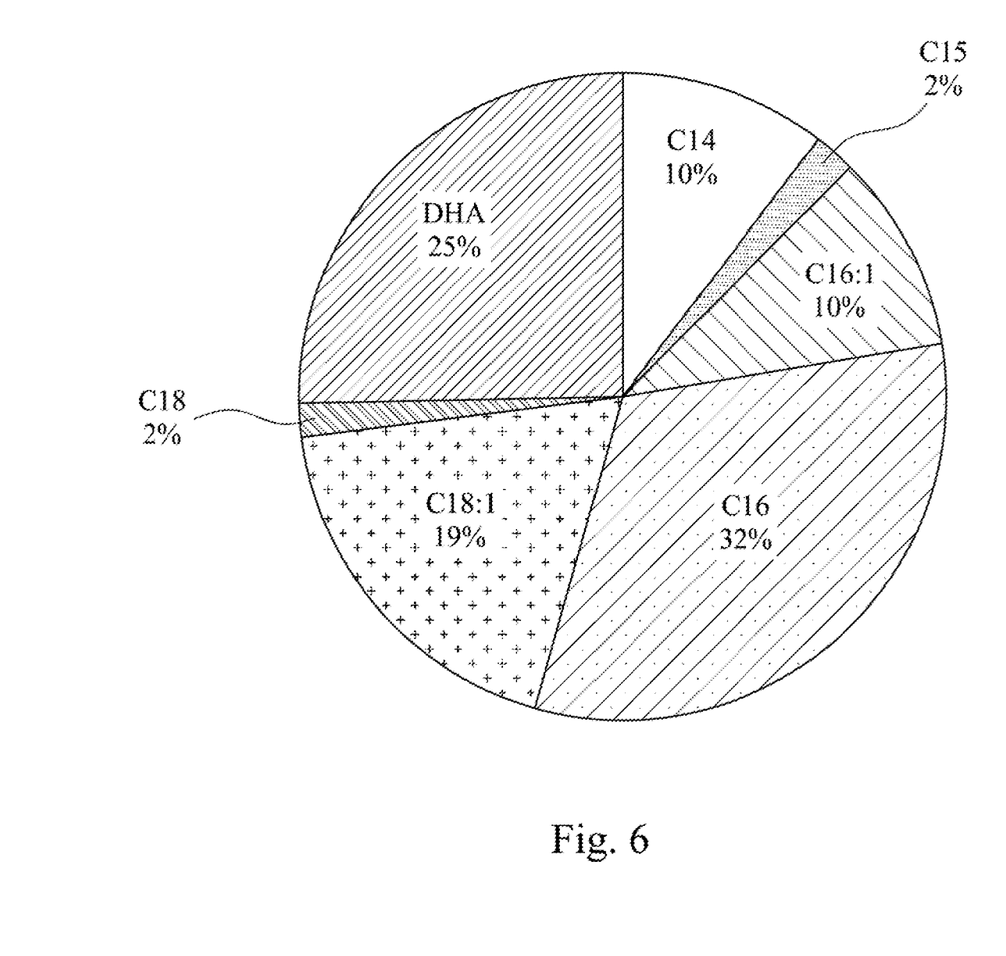
FIG. 6 shows weight percentage of each component in the effective fatty acids.

In FIG. 5, the GC-MS analysis result shows that the extracts contain many "effective fatty acids" that can be used to prepare biodiesel and small amounts of components that cannot used to prepare biodiesel. In this example, extracted effective fatty acids include tetradecanoic acid (marked as C14 in FIG. 5), pentadecanoic acid (marked as C15 in FIG. 5), hexadecanoic acid (marked as C16 in FIG. 5), heptadecanoic acid (marked as C17 in FIG. 5), octadecanoic acid (marked as C18 In FIG. 5), docosahexaenoic acid (marked as DHA in FIG. 5), C16 unsaturated fatty acid (marked as C16:1 In FIG. 5), and C18 unsaturated fatty acid (marked as C18:1 In FIG. 5). The total weight percentage of these effective fatty acids in the dried microalgae powder is about 35.7 wt %, and the weight percentages of each component in the effective fatty acids are shown in FIG. 6.

Examples 2-22

Using the $CO_2$-expanded Ethanol Solution to Extract *Schizochytrium* Powder

Figure 7:
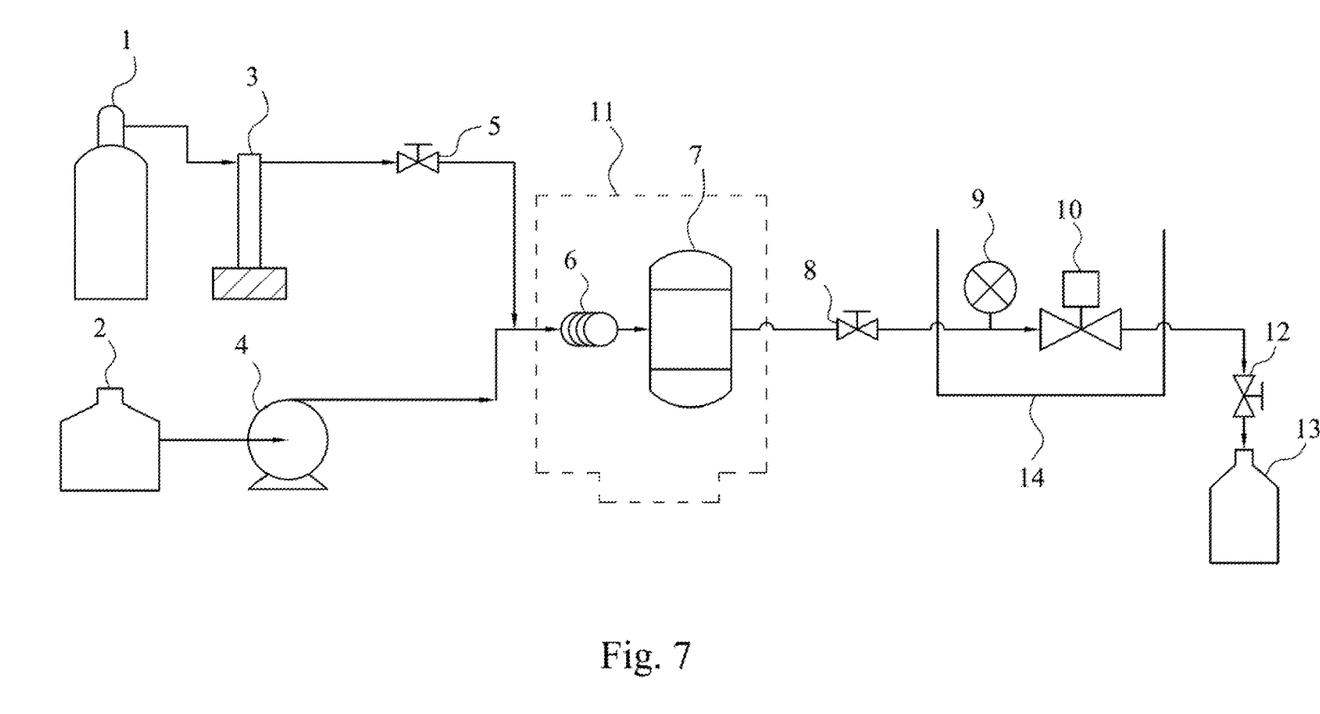
FIG. 7 is a diagram of an extracting apparatus according to an embodiment of the present disclosure.

FIG. 7 is a diagram illustrating an extracting apparatus according to an embodiment of the present disclosure. An method of extracting lipids from *Schizochytrium* using a $CO_2$-expanded ethanol solution as extractant is described in detail hereinafter accompanying with FIG. 7.

10 g of dried *Schizochytrium* powder were placed in an extracting tank 7. The temperatures of a oven 11 and a water bath tank 14 were set at the operation temperature. Valves 5 and 8 were closed and ethanol is transported from a storage tank 2 to the extracting tank 7 by using a high-pressure pump 4. After the pressure of the extracting tank 7 reached an operation pressure, the Injection of the ethanol was stopped, followed by 10 minutes of standing. Thereafter, the valves 5, 8, and 12 were opened, and a syringe pump 3 was switched on to inject a predetermined amount of pressurized $CO_2$, and the high-pressure pump 4 was also switched on to inject a predetermined amount of ethanol. The pressure inside the extracting tank 7A was regulated by a back pressure valve 10. The pressurized $CO_2$ and the ethanol were mixed in the mixer 6 to form $CO_2$-expanded alcohol solution, and then the $CO_2$-expanded alcohol solution entered the extracting tank 7 to performing lipids extraction. The $CO_2$-expanded alcohol solution then flowed through the valve 8 and the back pressure valve 10, and was discharged from the valve 12. After the $CO_2$-expanded alcohol solution was discharged from the valve 12, the pressure of the $CO_2$-expanded alcohol solution was dropped to 1 atm so that the $CO_2$ dissolved in the $CO_2$-expanded alcohol solution was transformed to gaseous $CO_2$, and the liquid ethanol with the extracts was collected in the collecting bottle 13. Thereafter, the ethanol containing the extracts was transferred into a rotor evaporator to remove ethanol at 80° C. so that dried extracts were obtained and the dried extracts were weighted.

The soluble amount of $CO_2$ in ethanol under a certain ethanol flow rate is limited to the $CO_2$ saturation solubility in the ethanol at the same temperature and pressure. Therefore, when the flow rate of $CO_2$ exceeds the saturation solubility, gas phase and liquid phase will coexist. From some references (Chang, C. J.; Chiu, K. L.; Day, C. Y., *J. Supercrit. Fluids.* 1998, 12, 223-237; Day, C.-Y.; Chang, C. J.; Chen, C.-Y., *J. Chem. Eng Data.* 1996, 41, 839-843; Um, J. S.; Lee, Y. Y.; Chun, H. S., *J. Supercrit.* 1994, 7, 219-230), the saturated flow rate of $CO_2$ may be calculated at each operation temperature and pressure.

Under the operation condition of Example 2 shown in Table 3 below, the pressurized $CO_2$ and ethanol formed a single-phase $CO_2$-expanded alcohol solution. In contrast, under the operation condition of Example 3, the pressurized $CO_2$ and ethanol formed a two-phase $CO_2$-expanded alcohol solution containing gas phase and liquid phase. The operation conditions of Examples 2 and 3 are summarized in Table 3. The pressure of the extracting tank 7 in Examples 2 and 3 was 600 psi. Extraction rates of Examples 2-22 were calculated by the following formula (3):

Extraction rate=(total weight of extracts/total weight of microalgae powder)×100%   (3).

TABLE 3

Operation conditions and results of examples 2 and 3

| Examples | Temp (° C.) | EtOH flow (ml/min) | $CO_2$ flow (ml/min) | Extraction rate (%) 30 min | 60 min | 90 min | 120 min | Phase number |
|---|---|---|---|---|---|---|---|---|
| 2 | 40 | 0.5 | 1 | 9.97 | 12.74 | 14.49 | 15.46 | Single (liquid) |
| 3 | 50 | 0.5 | 1 | 3.20 | 5.83 | 7.36 | 9.42 | Two (gas + liquid) |

The results in Table 3 shows that the single-phase $CO_2$-expanded alcohol solution had a better extraction rate. Therefore, the following Examples 4-22 were operated at a condition of forming the single-phase $CO_2$-expanded alcohol solution. The operation conditions and results of Examples 4-22 are shown in Table 4 below. In Table 4, the $CO_2$ flow ratio was calculated by the following formula (4):

$CO_2$ flow ratio=($CO_2$ flow rate/$CO_2$ saturated flow rate)×100%   (4).

TABLE 4

Operation conditions and results of Examples 4-22

| | Operation conditions | | | | | Extraction rate (%) | |
|---|---|---|---|---|---|---|---|
| Examples | EtOH flow (ml/min) | $CO_2$ Flow ratio | $CO_2$ flow (ml/min) | Press. (psi) | Temp. (° C.) | 30 min | 120 min |
| 4 | 0.5 | 90% | 3.038 | 1000 | 40 | 12.45 | 16.62 |
| 5 | 0.5 | 30% | 0.225 | 1000 | 60 | 5.27 | 10.54 |
| 6 | 0.75 | 60% | 0.869 | 700 | 50 | 9.95 | 15.37 |
| 7 | 1 | 30% | 2.025 | 1000 | 40 | 7.24 | 8.73 |
| 8 | 0.5 | 30% | 0.318 | 400 | 40 | 5.35 | 9.66 |
| 9 | 1 | 90% | 0.842 | 400 | 60 | 2.27 | 2.67 |
| 10 | 1 | 90% | 1.35 | 1000 | 60 | 10.04 | 20.66 |
| 11 | 0.75 | 60% | 0.869 | 700 | 50 | 11.01 | 18.46 |
| 12 | 0.5 | 90% | 0.421 | 400 | 60 | 7.19 | 13.84 |
| 13 | 1 | 90% | 1.909 | 400 | 40 | 12.97 | 17.15 |
| 14 | 1 | 30% | 0.45 | 1000 | 60 | 6.49 | 11.47 |
| 15 | 0.5 | 30% | 1.013 | 1000 | 40 | 11.53 | 16.06 |
| 16 | 1 | 30% | 0.281 | 400 | 60 | 6.31 | 9.16 |
| 17 | 0.5 | 30% | 0.14 | 400 | 60 | 3.49 | 10.04 |
| 18 | 0.5 | 90% | 0.955 | 400 | 40 | 6.97 | 14.61 |
| 19 | 0.5 | 90% | 0.675 | 1000 | 60 | 5.03 | 16.7 |
| 20 | 0.75 | 60% | 0.869 | 700 | 50 | 12.25 | 17.87 |
| 21 | 1 | 30% | 0.636 | 400 | 40 | 5.95 | 10.15 |
| 22 | 1 | 90% | 6.076 | 1000 | 40 | 14.61 | 15.46 |

In Examples 4-22, each of experimental parameters were designed and allocated according to an experimental design approach, and the effect of each parameter (i.e. temperature, pressure, ethanol flow, and $CO_2$ flow rate) to the extraction rate were obtained by statistical analysis. The analysis results show that temperature and pressure were relatively important parameters to the 30 minutes extraction, whereas $CO_2$ flow rate was relatively important parameter to the 120 minutes extraction.

Examples 23-25

Effect of $CO_2$ Flow

In Examples 23-25, only $CO_2$ flow rate was varied to observe the effect of the $CO_2$ flow rate to the extraction rate. The temperature was set at 40° C., pressure was 1000 psi, and ethanol flow rate was 1 mL/min. The experimental results are summarized in Table 5 below. In Table 5, the "extraction rate of effective fatty acids" was calculated by the following formula (5):

$$Y=(L/A)\times 100\% \quad (5);$$

in which Y is the extraction rate of effective fatty acids, L is the total weight of the extracted effective fatty acids, and A is the total weight of the microalgae powder.

TABLE 5

Operation conditions and results of Examples 23-25

| | Operation conditions | | | | Extraction rate of effective fatty acids (%) | |
|---|---|---|---|---|---|---|
| Examples | Temp. (° C.) | EtOH flow (ml/min) | Press. (psi) | $CO_2$ flow (ml/min) | 30 min | 120 min |
| 23 | 40 | 1 | 1000 | 2 | 11.28 | 13.62 |
| 24 | 40 | 1 | 1000 | 4 | 17.21 | 25.26 |
| 25 | 40 | 1 | 1000 | 6 | 30.92 | 34.9 |

The results of Table 5 show that the extracting effect was increased as the $CO_2$ flow increased. The extracting effect of example 25 was the best among Examples 23-25.

Compared Examples 1 and 2

Figure 8:
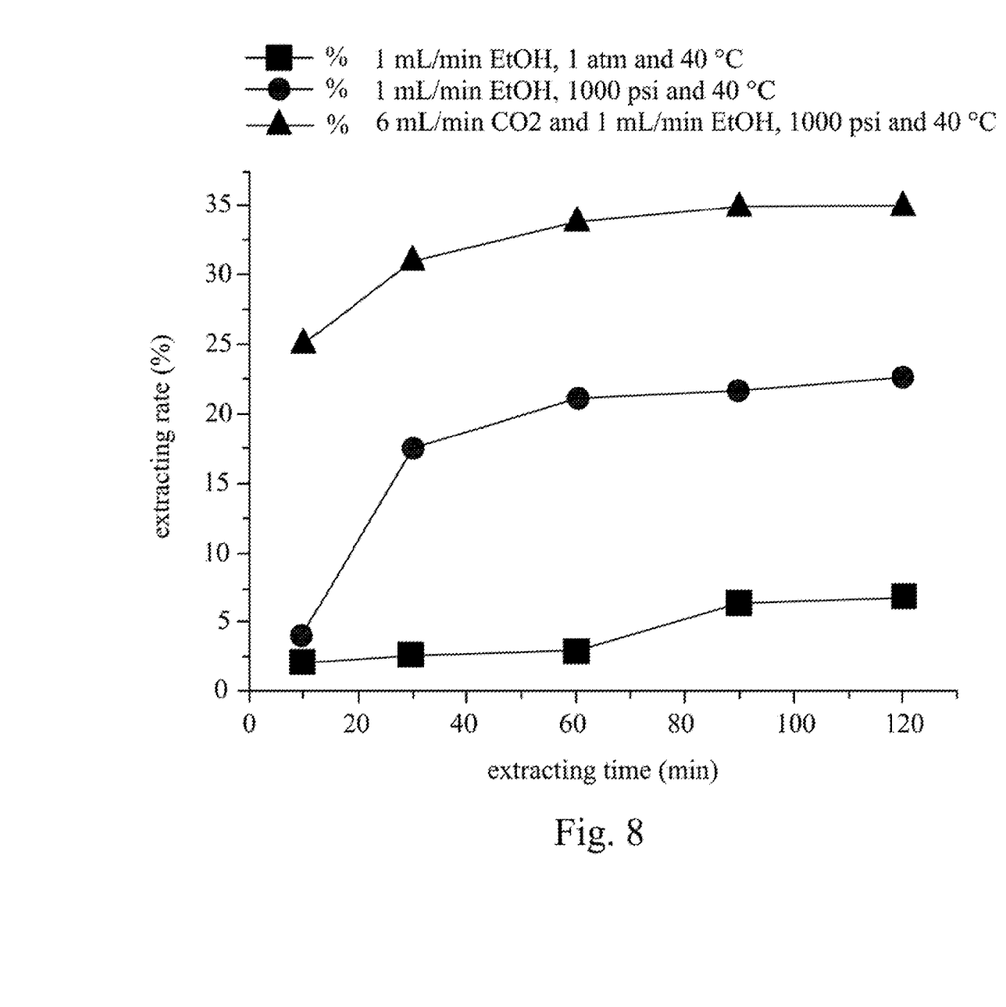
FIG. 8 is a diagram showing relationships between effective fatty acid extraction rate and extraction time of the compared examples 1 and 2, as well as the example 25.

Compared examples 1 and 2 were conducted by using the apparatus shown in FIG. 4, and were operated in a way similar to Examples described hereinbefore. The operation conditions and results of the compared examples 1 and 2 as well as Example 25 are summarized in Table 6 below. In compared example 1, ethanol at normal pressure was used as the extractant, and no $CO_2$ was added, in which the operation temperature was 40° C. and ethanol flow was 1 mL/min. In compared example 2, pressurized ethanol was used as the extractant, and no $CO_2$ was added, in which ethanol flow, operation pressure and temperature was respectively 1 mL/min, 1000 psi and 40° C. FIG. 8 is a diagram showing the relationships between the extraction time and the extraction rate of effective fatty acids in compared examples 1 and 2, as well as Example 25.

TABLE 6

| | Operation conditions | | | | Extraction rate of effective fatty acids (%) | | |
|---|---|---|---|---|---|---|---|
| | Temp. (° C.) | EtOH flow (ml/min) | Press. (psi) | $CO_2$ flow (ml/min) | 10 min | 30 min | 120 min |
| Compared example 1 | 40 | 1 | normal | — | 2.09 | 2.68 | 6.78 |
| Compared example 2 | 40 | 1 | 1000 | — | 5.33 | 17.72 | 22.6 |
| Example 25 | 40 | 1 | 1000 | 6 | 25.02 | 30.92 | 34.9 |

From the result shown in Table 6, it can be observed that using the $CO_2$-expanded alcohol solution as the extractant (Example 25) provides a higher extraction rate, as compared with the pressurized ethanol as the extractant (compared example 2). Further, the $CO_2$-expanded alcohol solution can extract a large amount of effective fatty acids in a short time period. When the extraction time was 10 minutes, the extraction rate in Example 25 was 25.02%. However, the extraction rate in compared example 2 was only 5.33%. The extraction rate in Example 25 was 5 folds of that in compared example 2 when the extraction time was 10 minutes.

From the results illustrated in Table 6, the extraction rate for each mL of ethanol in Example 25 and compared examples 1 and 2 can be calculated, and the results are summarized in Table 7 below. Example 25 shows a much better extraction efficiency for each mL of ethanol, as compared with compared examples 1 and 2. Therefore, according to the embodiments of the present disclosure, using $CO_2$-expanded alcohol solution as the extractant can not only shorten the required extraction time, but can increase the extraction efficiency per unit of ethanol.

TABLE 7

Extraction efficiency for each mL of ethanol

| Extraction time (min) | Extracting efficiency of 1 mL ethanol (%/mL) | | |
|---|---|---|---|
| | Compared example 1 | Compared example 2 | Example 25 |
| 10 | 0.21 | 0.39 | 2.50 |
| 30 | 0.09 | 0.59 | 1.03 |
| 120 | 0.06 | 0.19 | 0.29 |

All the features disclosed in this specification (including any accompanying claims, abstract, and drawings) may be replaced by alternative features serving the same, equivalent or similar purpose, unless expressly stated otherwise. Thus, each feature disclosed is one example only of a generic series of equivalent or similar features.

What is claimed is:

1. A method of extracting a lipid from microalgae, comprising:
   dissolving pressurized $CO_2$ gas in a liquid alcohol to form a single-phase $CO_2$-expanded alcohol solution that is at a pressure of about 400 psi to about 1200 psi and a temperature of about 30° C. to about 65° C.; and
   contacting the single-phase $CO_2$-expanded alcohol solution at the pressure of about 400 psi to about 1200 psi and the temperature of about 30° C. to about 65° C. with microalgae containing a lipid to extract the lipid from the microalgae and dissolve the lipid into the single-phase $CO_2$-expanded alcohol solution, wherein the single-phase $CO_2$-expanded alcohol solution at the pressure of about 400 psi to about 1200 psi has a $CO_2$ molar fraction ranging from about 0.4 to about 0.63.

2. The method of claim 1, further comprising immersing the microalgae in a liquid alcohol at a pressure of about 400 psi to about 1500 psi before contacting the single-phase $CO_2$-expanded alcohol solution with the microalgae.

3. The method of claim 1, wherein the microalgae comprises *Schizochytrium* sp., and the alcohol comprises ethanol.

4. The method of claim 1, wherein the lipid comprises a fatty acid.

5. The method of claim 1, wherein the contacting the single-phase $CO_2$-expanded alcohol solution at the pressure of about 400 psi to about 1200 psi and the temperature of about 30° C. to about 65° C. with the microalgae containing the lipid comprises contacting the single-phase $CO_2$-expanded alcohol solution with the microalgae at the pressure of about 800 psi to about 1200 psi and the temperature of about 35° C. to about 45° C.

6. The method of claim 1; further comprising:
  decreasing a pressure of the $CO_2$-expanded alcohol solution containing the lipid to form $CO_2$ gas and an alcohol liquid solution containing the lipid after contacting the $CO_2$-expanded alcohol solution with the microalgae; and
  separating the lipid from the alcohol liquid solution.

\* \* \* \* \*